(12) United States Patent
Koyama (10) Patent No.: US 7,811,187 B2
(45) Date of Patent: Oct. 12, 2010

(54) CONTINUOUSLY VARIABLE TRANSMISSION

(75) Inventor: Takao Koyama, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 857 days.

(21) Appl. No.: 11/028,761

(22) Filed: Jan. 5, 2005

(65) Prior Publication Data

US 2005/0153805 A1 Jul. 14, 2005

(30) Foreign Application Priority Data

Jan. 9, 2004 (JP) ............................. 2004-004296

(51) Int. Cl.
*F16H 55/56* (2006.01)
(52) U.S. Cl. .......................................... 474/28; 474/46
(58) Field of Classification Search ................... 474/18, 474/28, 46
See application file for complete search history.

(56) References Cited

U.S. PATENT DOCUMENTS

| | | | | |
|---|---|---|---|---|
| 4,229,988 A | * | 10/1980 | Rattunde | ...................... 474/28 |
| 5,169,365 A | * | 12/1992 | Friedmann | ................... 474/18 |
| 6,234,925 B1 | * | 5/2001 | Walter | ........................... 474/18 |
| 6,342,024 B1 | * | 1/2002 | Walter et al. | ................. 475/210 |
| 6,561,934 B2 | * | 5/2003 | Kashiwase | .................... 474/28 |
| 6,565,465 B2 | * | 5/2003 | Nishigaya et al. | ............. 474/28 |

FOREIGN PATENT DOCUMENTS

| | | |
|---|---|---|
| JP | 64-026062 A | 1/1989 |
| JP | 11-236965 A | 8/1999 |

* cited by examiner

*Primary Examiner*—Richard W Ridley
*Assistant Examiner*—Terence Boes
(74) *Attorney, Agent, or Firm*—Foley & Lardner LLP (57) ABSTRACT

A continuously variable transmission has a primary pulley having a primary movable sheave that is capable of moving to change a groove width of the primary pulley, and a secondary pulley having a secondary movable sheave that is capable of moving to change a groove width of the secondary pulley. Endless flexible members are engaged with the primary pulley and the secondary pulley to transmit torque therebetween. At least one of the pulleys has a thrust applying mechanism that is capable of applying spring force and first fluid pressure force to the movable sheave of the pulley so as to narrow the groove width thereof and generating second fluid pressure force opposite to the spring force and the first fluid pressure force.

20 Claims, 5 Drawing Sheets

PRIOR ART

FIG. 5
PRIOR ART

CONTINUOUSLY VARIABLE TRANSMISSION

BACKGROUND OF THE INVENTION

1. Field of the Invention

The present invention relates to a continuously variable transmission that is equipped with variable diameter pulleys and endless flexible members engaged with the pulleys so as to provide continuously variable speed ratio between the pulleys by adjusting groove widths of the pulleys, and also relates to a thrust applying method of the continuously variable transmission.

2. Description of the Related Art

Figure 4:
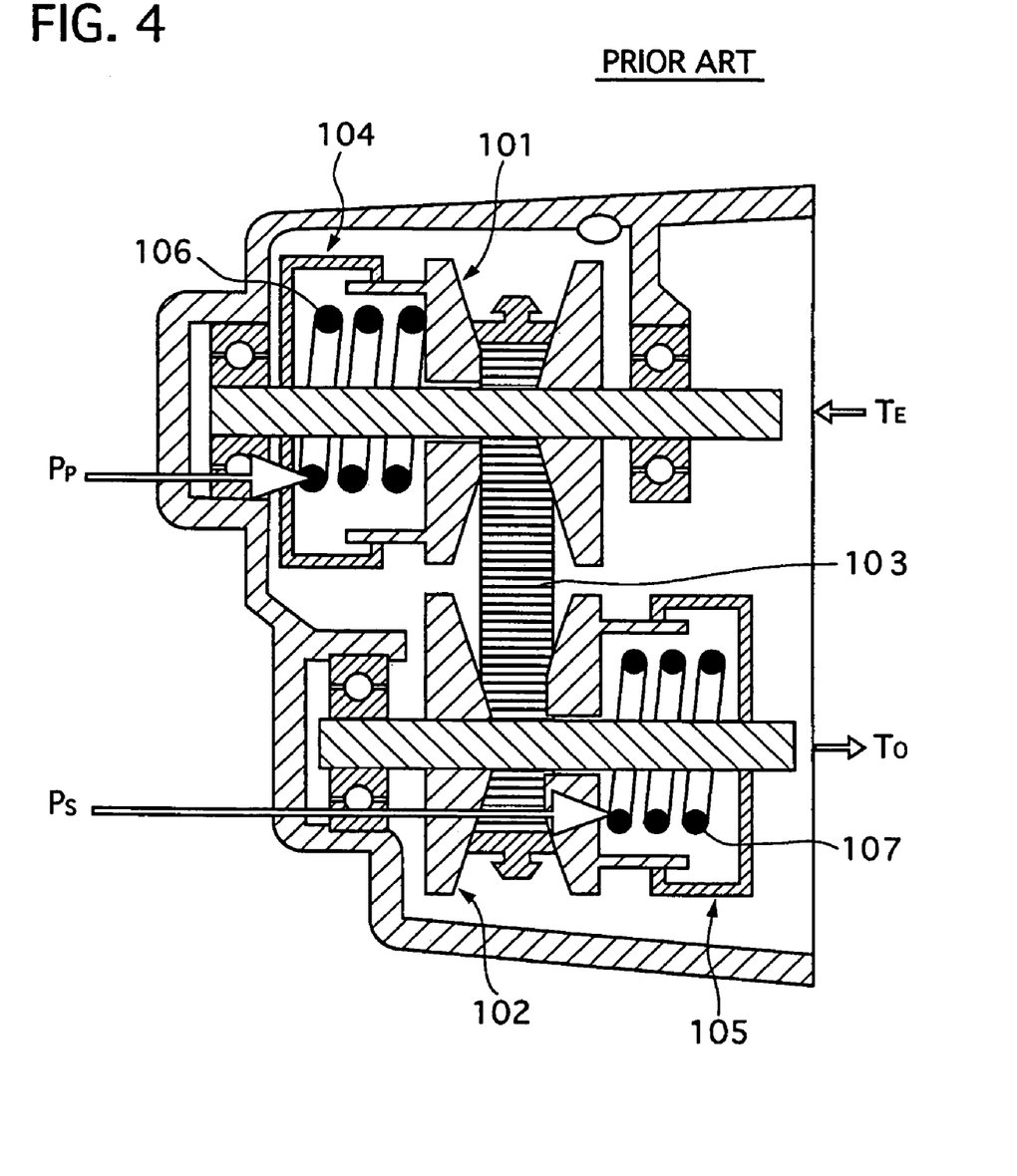
FIG. 4 is a sectional view of a variator of a conventional continuously variable transmission.

A continuously variable transmission of this kind is disclosed in Japanese patent laying-open publication No. Hei 11-236965. As shown in FIG. 4, this continuously variable transmission includes a primary pulley 101, a secondary pulley 102, and a metal belt 103 mating with the pulleys 101 and 102, where the pulleys 101 and 102 are controlled to change their groove widths by application of the resultant force consisting of a fluid pressure force and a spring force. This spring force decreases the maximum fluid pressure to be applied to the pressure chambers of the pulleys 101 and 102 at the highest speed ratio and the lowest speed ratio, resulting in the reduction of fluid-pump capacity.

The above known conventional continuously variable transmission, however, encounters a problem that the reduction amount of the fluid-pump capacity is limited to be small. The reason is as follows: the fluid pressure forces are produced by introducing pressurized fluid into primary and secondary fluid pressure chambers of primary and secondary thrust applying mechanisms 104 and 105. The fluid pressure forces act only in the same direction on the pulleys 101 and 102 so as to narrow their groove widths, which causes the thrust difference between the primary and second pulleys 101 and 102 to be determined regardless of the spring forces, only by the difference between fluid pressure forces applied to them. This means that one of the pulleys 101 and 102 requires high pressurized fluid to be supplied so as to obtain the highest and lowest speed ratios and prevent a slippage between the belt 103 and the pulleys 101 and 102, limiting reduction of the pump capacity.

Figure 5:
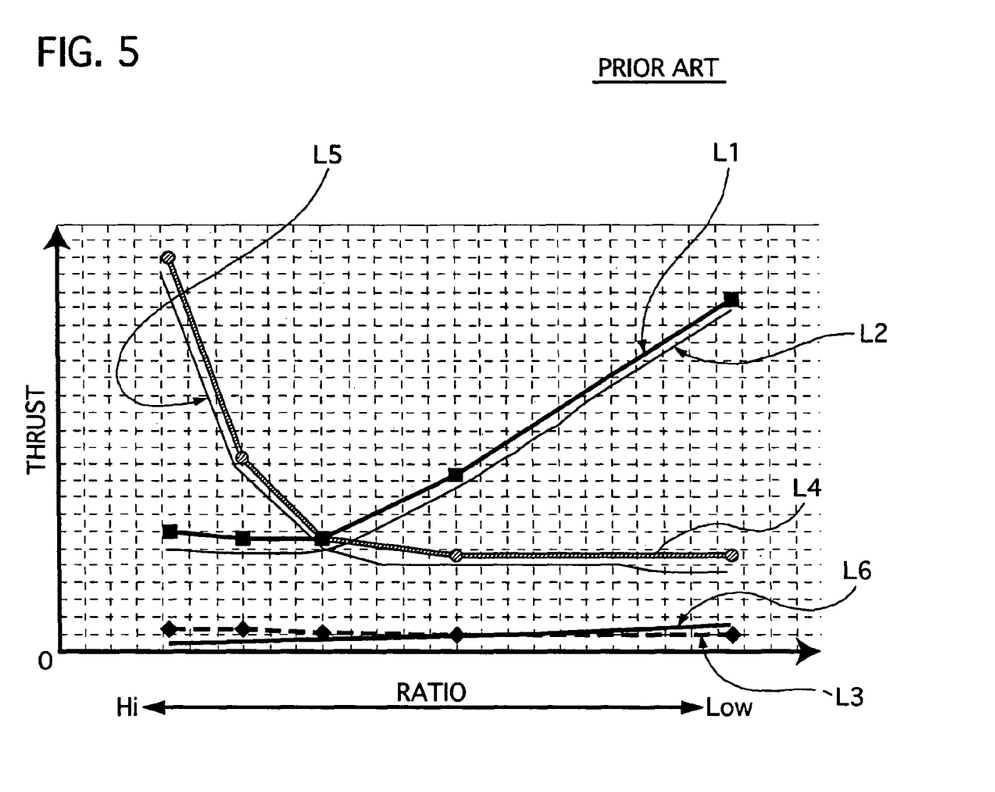
FIG. 5 is a diagram showing relationships of characteristics of necessary thrusts, fluid pressure forces, and spring forces with relative to speed ratios from a "HIGH" speed ratio to a "LOW" speed ratio of the variator of the conventional continuously variable transmission shown in FIG. 4.

Specifically, FIG. 5 shows relationships of characteristics of necessary pulley thrust, fluid pressure forces, and spring forces with relative to speed ratio from a "HIGH" speed ratio to a "LOW" speed ratio, where a characteristic line L1 shows thrust (FDS) necessary for the secondary pulley 102; a characteristic line L2 shows fluid pressure force (FpS) to be applied to the secondary pulley 102; a characteristic line L3 shows spring force (FsS) of a secondary spring 107 acting on secondary pulley 102; a characteristic line L4 shows thrust (FDP) necessary for the primary pulley 101; a characteristic line L5 shows fluid pressure force (FpP) to be applied to the primary pulley 101; and a characteristic line L6 shows spring force (FsP) of a primary spring 106 acting on the primary pulley 101.

The secondary-pulley thrust FDS is obtained by adding the secondary spring force FsS to the secondary fluid pressure force FpS, which gives the following equation.

$$FDS=FpS+FsS$$

The primary-pulley thrust FDP is obtained by adding the primary spring force FsP to the primary fluid pressure force FpP, which gives the following the equation.

$$FDP=FpP+FsP$$

The thrust difference ΔFD at the lowest (the maximum LOW) speed ratio is obtained by subtracting the secondary-pulley thrust FDS from the first primary-pulley thrust FDP, which yields the following equation.

$$\Delta FD=FDP-FDS=(FpP+FsP)-(FpS+FsS)$$

When the primary and secondary spring forces FsP and FsS are set to have the same strength, the above equation of the thrust difference ΔFD at the lowest speed ratio is expressed as the following equation.

$$\Delta FD=FpP-FpS$$

Similarly, the thrust difference ΔFD at the highest (the maximum HIGH) speed ratio is obtained by subtracting the primary-pulley thrust FDP from the secondary-pulley thrust FDS, and when the primary and secondary spring forces FsP and FsS are set to have the same strength, the equation of the thrust difference ΔFD at the highest speed ratio is expressed by the following equation.

$$\Delta FD=FpS-FpP$$

The spring forces FsP and FsS can not be set larger than the necessary thrust FDP and FDS, The above equations shows that the thrust differences ΔFD at the lowest and highest speed ratios are produced by differences between the primary and secondary fluid pressure forces FpP and FpS. This results in the fact that when the pressure PL supplied to one of the pulleys to be kept at lower pressure is set to obtain proper belt-clamping force, the pressure PH supplied to the other one of the pulleys to be kept at the high pressure needs to be set to be larger than the pressure PL by the pressure corresponding to the thrust difference ΔFD.

In order to obtain the sufficient thrust difference both at the lowest and highest speed rates, the pressures to be supplied to the fluid pressure chambers need approximately four to five times higher pressure, which requires higher fluid-pump capacity, resulting in degradation of fuel consumption especially when climbing a long slope at the lowest speed ratio or when high-speed running at the highest speed ratio.

When the spring forces are set different from each other between the primary and secondary springs 106 and 107, the similar problem occurs.

It is, therefore, an object of the present invention to provide a continuously variable transmission which overcomes the foregoing drawbacks and can obtain sufficient thrust difference between a primary pulley and a secondary pulley at the lowest and/or highest speed ratio with lower fluid pressure applied to the pulley to decrease a necessary fluid-pump capacity and improve fuel consumption.

It is another object of the present invention to provide a thrust applying method for a continuously variable transmission which overcomes the foregoing drawbacks and can obtain sufficient thrust difference between a primary pulley and a secondary pulley at the lowest and/or highest speed ratio with lower fluid pressure applied to the pulley to decrease a necessary fluid-pump capacity and improve fuel consumption.

SUMMARY OF THE INVENTION

According to a first aspect of the present invention there is provided a continuously variable transmission including a primary pulley, a secondary pulley, a belt, a control valve unit, a control unit and a thrust applying mechanism. The primary pulley has a primary movable sheave that is capable of moving to change a groove width of the primary pulley. The secondary pulley has a secondary movable sheave that is capable of moving to change a groove width of the secondary pulley. The belt is engaged with the primary pulley and the secondary pulley to transmit torque therebetween. The control valve unit is capable of producing a first fluid pressure and a second fluid pressure to supply to a first fluid chamber and a second fluid chamber, respectively, of at least one of the primary pulley and the secondary pulley. The first and second pressure chambers are fluid-tight. The control unit outputs a command to the control valve unit to obtain target fluid pressures of the first fluid pressure and the second fluid pressure. The thrust applying mechanism is capable of applying a resultant force to the movable sheave of the at-least one of the primary and secondary pulleys so as to narrow the groove width thereof. The resultant force contains a spring force of a spring, a first fluid pressure force obtained based on the first fluid pressure and acting in the same direction as the spring force, and a second fluid pressure force acting in a direction opposite to the spring force and the first fluid pressure force. The first fluid pressure force and the second fluid pressure force are set such that the spring force is set to be larger than a thrust which is necessary to obtain one of a low speed ratio by the primary pulley and a high speed ratio by the secondary pulley.

According to a second aspect of the present invention there is provided a thrust applying method for a continuously variable transmission that is equipped with a primary pulley having a primary movable sheave that is capable of moving to change a groove width of said primary pulley, a secondary pulley having a secondary movable sheave that is capable of moving to change a groove width of said secondary pulley, and a belt engaged with the primary pulley and the secondary pulley to transmit torque therebetween. The method includes applying spring force to the movable sheave of at least one of the primary and secondary pulleys so as to narrow the groove width thereof, supplying a first fluid pressure from a control valve to a first fluid pressure chamber, which is fluid-tight, of the at-least one of the primary and secondary pulleys such that the first fluid pressure is controlled as a target fluid pressure by a control unit so as to generate a first fluid pressure force by the thrust applying mechanism in the same direction as the spring force and supplying a second fluid pressure from the control valve unit to a second fluid pressure chamber, which is fluid-tight, of the at-least one of the primary and secondary pulleys such that the second fluid pressure is controlled to be a target fluid pressure by the control unit so as to generate a second fluid pressure force by the thrust applying mechanism in a direction opposite to the spring force and the first fluid pressure force. The movable sheave of the at-least one of the primary and secondary pulleys is pressed by thrust obtained by a resultant force of the spring force, the first fluid pressure force, and the second fluid pressure force. The first fluid pressure force and the second fluid pressure force are set such that the spring force is set to be larger than a thrust which is necessary to obtain one of a low speed ratio by the primary pulley and a high speed ratio by the secondary pulley.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Throughout the following detailed description, similar reference characters and numbers refer to similar elements in all figures of the drawings, and their descriptions are omitted for eliminating duplication.

A continuously variable transmission according to an embodiment of the present invention will be described in detail with the accompanying drawings of FIGS. 1 to 3.

Figure 1:
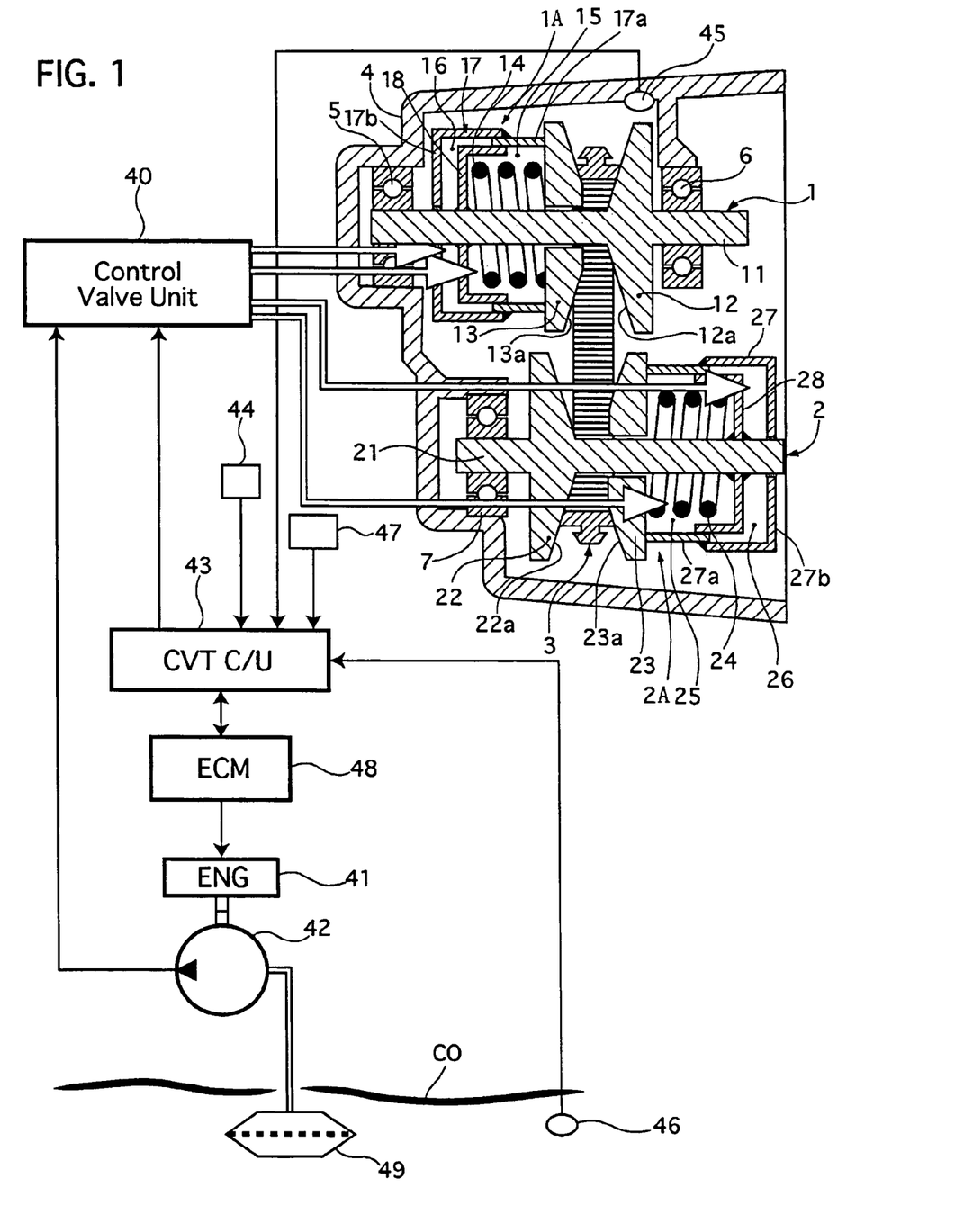
FIG. 1 is a schematic sectional view of a variator and its control system of a continuously variable transmission according to an embodiment of the present invention.

FIG. 1 shows a schematic sectional view of the continuously variable transmission (hereinafter referred to as "CVT") that is used for a motor vehicle and includes a variator that can obtain continuously variable speed ratio and its control system to hydraulically and electronically control the variator.

The variator is equipped a primary pulley 1, a secondary pulley 2 arranged in parallel with the primary pulley 2, and a metal push belt 3 engaging with the primary and secondary pulleys 1 and 2.

The primary pulley 1 has a primary fixed sheave 12 integrally connected with a primary shaft 11 and a movable sheave 13 that is supported on the primary shaft 11 to rotate together with the primary shaft 11 and to move toward and away from the primary fixed sheave 12 so as to change a groove width of the primary pulley 1. The primary fixed sheave 12 is formed with a cone-shaped belt-contacting surface 12a to face the primary movable sheave 13, while the primary movable sheave 13 is formed with a cone-shaped belt-contacting surface 13a to face the belt-contacting surface 12a of the primary fixed sheave 12. The fixed and movable sheaves 12 and 13 have a primary variable groove to receive the belt 3 between their belt-contacting surfaces 12a and 13a.

The secondary pulley 2 has a secondary fixed sheave 22 integrally connected with a secondary shaft 21 and a secondary movable sheave 23 that is supported on the secondary shaft 21 to rotate together with the secondary shaft 21 and to move toward and away from the secondary fixed sheave 22 so as to change a groove width of the secondary pulley 2. The secondary fixed sheave 22 is formed with a cone-shaped belt-contacting surface 22a to face the movable sheave 23, while the secondary movable sheave 23 is formed with a cone-shaped belt-contacting surface 23a to face the belt-contacting surface 22a of the secondary fixed sheave 22. The fixed and movable sheaves 22 and 23 have a secondary variable groove to receive the belt 3 between their belt-contacting surfaces 22a and 23a.

Note that the fixed sheave 12 and the movable sheave 13 of the primary pulley 1 are arranged at positions opposite to those of the secondary pulley 2, which prevents the belt 3 from being twisted due to the movements of the movable sheaves 13 and 23 of the primary and secondary pulleys 1 and 2.

The primary shaft 11 is rotatably supported on a transmission case 4 via two sets of bearings 5 and 6 at its both end portions and connected with an output shaft of an engine 41 to transmit its output torque to the primary pulley 1 through a moving-off element, such as a torque converter or a starting clutch, and forward and reverse gears. The secondary shaft 21 is supported on the transmission case 4 via bearings 7 and 8, which are shown only in FIG. 2, at its end portions and connected to drive wheels, not shown, to transmit driving torque to the wheels through a final drive unit with differential gears. The primary shaft 11 and the secondary shaft 21 correspond to a pulley shaft of the present invention.

The primary pulley 1 is provided with a primary thrust applying mechanism 1A that applies the resultant force, corresponding to thrust, consisting of fluid pressure force and spring force to the first movable sheave 13 so as to narrow the groove width of the primary pulley 1. The secondary pulley 2 is provided with a secondary thrust applying mechanism 2A that applies the resultant force, corresponding to thrust, consisting of fluid pressure force and spring force to the second movable sheave 23 to narrow the groove width of the secondary pulley 2. The structure of the primary and second thrust applying mechanisms 1A and 2A will be described in detail later.

Figure 2:
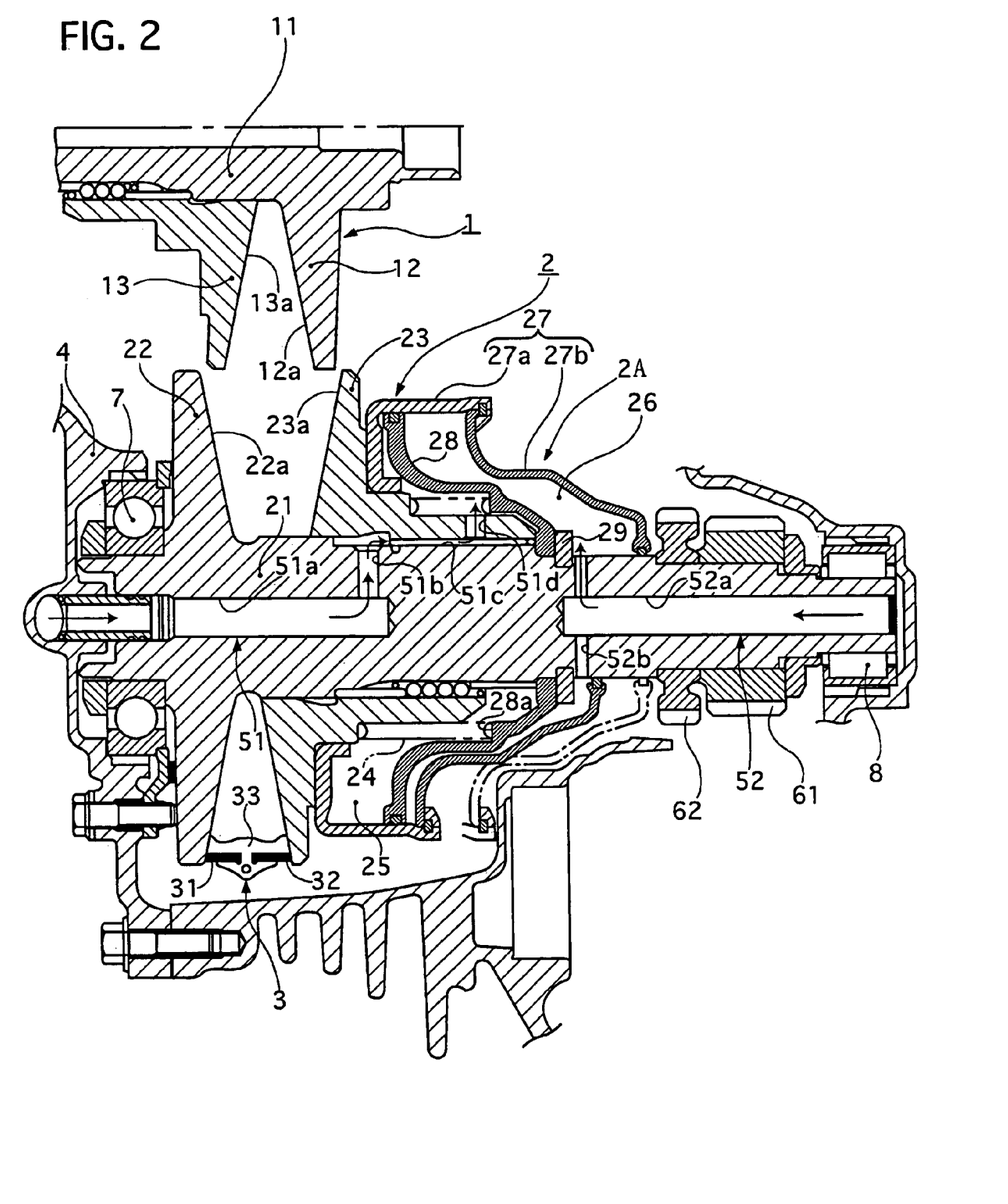
FIG. 2 is an enlarged sectional view of the variator of the continuously variable transmission shown in FIG. 1.

The metal push belt 3, as shown in FIG. 2, includes hundreds of belt elements 33 and two sets of around ten laying metal belts 31 and 32 arranged on and engaged with the both sides of the elements 33 to carry them. The elements contact at their both tapered sides with the belt-contacting surfaces 12a, 13a, 22a, and 23a of the fixed and movable sheaves 12, 13, 22, and 23 of the primary and secondary pulleys 1 and 2. The belt 3 corresponds to endless flexible members of the present invention.

The primary and secondary thrust applying mechanisms 1A and 2A have a primary and secondary fluid pressure chambers that are respectively arranged at rear sides of the movable sheaves 13 and 23 and supplied with pressurized fluid from a control valve unit 40, so that they apply the thrust to the primary and second movable sheaves 13 and 23 to move and adjust the groove widths of the primary and second pulleys 1 and 2 according to the pressure value of the supplied pressurized fluid. The control valve unit 40 is supplied with the pressurized fluid by an fluid pump 42 driven by the engine 41 and sucks CVT fluid CO in an oil pan, not shown, through an oil strainer 49.

The control valve unit 40 is electrically controlled by a CVT control unit 43. The CVT control unit 43 is electrically connected to an accelerator sensor 44 to detect an accelerator opening degree and output an accelerator signal, an input speed sensor 45 to detect a rotational speed of the primary shaft 11 and output an input speed signal, an oil-temperature sensor 46 to detect oil-temperature in the oil pan and output an oil-temperature signal, a vehicle speed sensor 47 to detect a vehicle speed and output a vehicle speed signal. Target fluid pressures to be supplied to the primary and second thrust applying mechanisms 1A and 2A are calculated based on the above signals by the control unit 43, which outputs a command to the control valve unit 40 to obtain the target fluid pressures.

The CVT control unit 43 is also electrically connected to an engine control module 48 that controls the engine 41, which establishes two-way communication between them. An engine-torque control command is inputted from the control unit 43 to the engine control module 48 when the control unit 43 judges a requirement of increase or decrease of the engine torque based on the target fluid pressure.

FIG. 2 shows an enlarged sectional view of the variator, especially the secondary pulley 2, of the CVT shown in FIG. 1. In FIG. 2, an upper half portion of the secondary pulley 2 illustrates a state in which the movable sheave 23 moves backward to widen the groove width of the secondary pulley 2, which can bring a "HIGH" speed ratio. A lower half portion illustrates a state in which the movable sheave 23 moves forward to narrow the groove width of the secondary pulley 2, which can bring a "LOW" speed ratio.

The secondary pulley 2 has the secondary fixed sheave 22 integrally formed with the secondary shaft 21 and the secondary movable sheave 23 engaged with the secondary shaft 21 by a ball spline so that the movable sheave 23 can rotate together with the secondary shaft 21 and move toward and away from the fixed sheave 22 along a rotation axis of the secondary shaft 21.

The movable sheave 23 is provided at its rear side, opposite to the belt-contacting surface 23a, with the secondary thrust applying mechanism 2A that has a first fluid pressure chamber 25, a second fluid pressure chamber 26, and a secondary spring 24 so as to apply thrust to the movable sheave 23. The first and second fluid pressure chamber 25 and 26 are defined by a fixed wall member 28, which is fixed on the secondary shaft 21 at its stepped portion by using a snap ring 29. The spring 24 is disposed between a flange 28a of the fixed wall member 28 and the rear surface of the movable sheave 23, and applies its spring force to the movable sheave 23 in a direction toward the fixed sheave 22.

The secondary thrust applying mechanism 2A further includes a cylindrical shaped outer peripheral wall member 27a that is liquid-tightly fixed to the rear surface of the movable sheave 23 by welding and a movable wall member 27b that is fixed to an opening edge portion of the outer peripheral wall member 27a by welding after assembly of the movable sheave 23 and the movable wall member 27b on the secondary shaft 21 with the fixed wall member 28 being fixed on the shaft 21.

The fixed wall member 28 is provided at its outer peripheral edge portion with a seal that liquid-tightly contacts with an inner peripheral surface of the outer peripheral wall member 27a so that the outer peripheral wall member 27a can move with relative to the fixed wall member 28. The movable wall member 27b is provided at an outer peripheral portion with a seal that liquid-tightly contacts with the outer peripheral wall member 27a, while it is provided at its inner peripheral portion with a seal that liquid-tightly contacts with the outer surface of the secondary shaft 21 so that the movable wall member 27b can move together with the movable sheave 23 with relative to the secondary shaft 21.

Accordingly, the first fluid pressure chamber 25 is formed by an inner space defined by the outer peripheral wall member 27a, the fixed wall member 28, and the movable sheave 23 and contains the spring 24, while the second fluid pressure chamber 26 is formed by an inner space defined by the outer peripheral wall member 27a, the fixed wall member 28, and the secondary shaft 21. The first and second fluid pressure chambers 25 and 26 are, namely, formed by dividing a secondary fluid pressure chamber arranged at the rear side of the movable sheave 23 by the fixed wall member 28.

The first fluid pressure chamber 25 is fluidically communicated with a first axial oil passage 51a formed in the secondary shaft 21 through a first radial oil passage 51b formed in the shaft 21, a second axial oil passage 51c formed between the inner surface of the movable sheave 23 and the outer surface of the shaft 21, and a second radial oil passage 51d formed in the movable sheave 23. The second fluid pressure chamber 26 is fluidically communicated with a third axial fluid passage 52a through a third axial fluid passage 52b.

The secondary shaft 21 has an output gear 61 to output the driving force from the secondary pulley 2 and a teethed wheel 62 for detecting the vehicle speed by the vehicle speed sensor 47 shown in FIG. 1.

The primary pulley 1 and its thrust applying mechanism 1A have structures similar to the secondary pulley 2 and its thrust applying mechanism 2A with a cylindrical shaped outer peripheral wall member 17a, a movable wall member 17b, and a fixed wall member 18 as shown in FIG. 1. A first and second fluid pressure chambers 15 and 16 are formed by dividing a secondary fluid pressure chamber arranged at the rear side of the movable sheave 13 by the fixed wall member 18. As mentioned above, they are constructed so that the thrusts act in the directions opposite to each other.

The operation of the continuously variable transmission of the embodiment will be described with the accompanying drawings of FIGS. 1 to 3.

A low speed ratio is obtained when the groove width of the primary pulley 1 is wider than that of the secondary pulley 2, while a high speed ratio is obtained when the groove width of the primary pulley 1 is narrower than that of the secondary pulley 2. Accordingly, a radius of the belt 3 becomes smaller at the primary pulley 1 than at the secondary pulley 2, where thrust of the primary pulley 1 is set smaller than that of the secondary pulley 2. The radius becomes larger at the primary pulley 1 than at the secondary pulley 2, where thrust of the primary pulley 1 is set larger than that of the secondary pulley 2. These changes of the groove widths and radiuses are performed by controlling thrusts that are generated by the primary and secondary thrust applying mechanisms 1A and 2A.

In order to obtain a desired speed ratio, the primary thrust applying mechanism 1A generates necessary thrust FDP, which is obtained as the resultant force of primary spring force FsP acting in the direction of the trust FDP, first fluid pressure force Fp1P acting in the same direction as the spring force FsP, and second fluid pressure force Fp2P acting in a direction opposite to the spring force FsP. At the same time, the secondary thrust applying mechanism 2A generates necessary thrust FDS, which is obtained as the resultant force of secondary spring force FsS acting in the direction of the trust FDS, first fluid pressure force Fp1S acting in the same direction as the spring force FsS, and second fluid pressure force Fp2S acting in a direction opposite to the spring force FsS.

Figure 3:
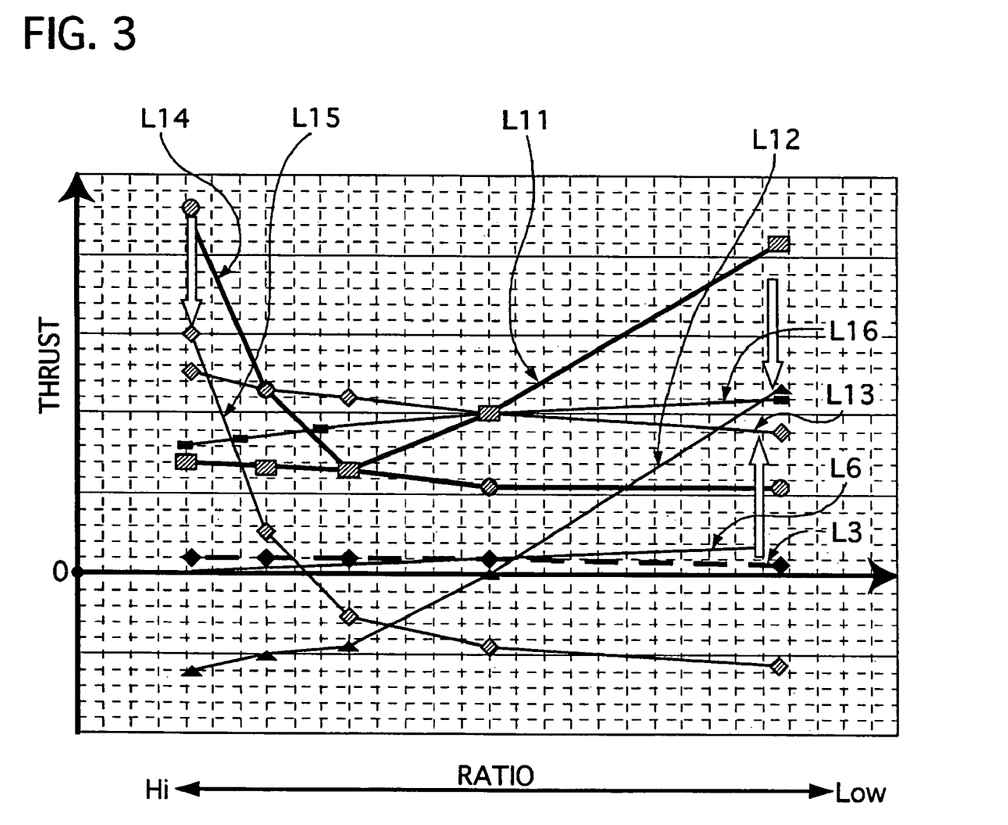
FIG. 3 is a diagram showing relationships of characteristics of necessary thrusts, fluid pressure forces, and spring forces with relative to speed ratios from a "HIGH" speed ratio to a "LOW" speed ratio of the variator shown in FIGS. 1 and 2.

FIG. 3 shows relationships of characteristics of the necessary thrusts FDP and FDS, the fluid pressure forces Fp1P, Fp1S, Fp2P, and Fp2S, and the spring forces FsP and FsS with relative to the speed ratios from the highest to the lowest speed ratio. In FIG. 3, a characteristic line L11 shows the necessary thrust FDS in the secondary pulley 2; a characteristic line L12 shows a secondary fluid pressure force FpS obtained by the resultant force of the first fluid pressure force Fp1S and the second fluid pressure force Fp2S; a characteristic line L13 shows the secondary spring force FsS; a characteristic line L14 shows the necessary thrust FDP in the primary pulley 1; a characteristic line L15 shows a primary fluid pressure force FpP obtained by the resultant force of the first fluid pressure force Fp1P and the second fluid pressure force Fp2P; and a characteristic line L16 shows the primary spring force FsP. FIG. 5 also shows the characteristic lines L3 and L6 of the spring forces of the primary and secondary springs used in the conventional CVT and shown in FIG. 5, for the sake of comparison.

The necessary thrust FDS of the secondary pulley 2 is, therefore, expressed by the following equation.

$$FDS = FpS + FsS = Fp1S + FsS - Fp2S$$

The necessary thrust FDP of the primary pulley 1 is expressed by the following equation.

$$FDP = FpP + FsP = Fp1P + FsP - Fp2P$$

In order to change the speed ratio and maintain the changed speed ratio, thrust difference needs to be set between the primary and second pulleys 1 and 2 as follows.

The thrust difference $\Delta FD$ at the lowest speed ratio is obtained by subtracting the thrust FDS of the secondary pulley 2 from the thrust FDP of the primary pulley 1, which gives the following equation.

$$\Delta FD = FDP - FDS = (Fp1P + FsP - Fp2P) - (Fp1S + FsS - Fp2S)$$

When the primary and secondary spring forces FsP and FsS are set the same strength, the above equation of the thrust difference $\Delta FD$ at the lowest speed ratio is expressed by the following equation.

$$\Delta FD = (Fp1P - Fp2P) - (Fp1S - Fp2S)$$

In order to obtain the thrust difference $\Delta FD$ at the lowest speed ratio with the lowest fluid pressure, the large necessary thrust FDP of the primary pulley 1 is obtained by the sum of the primary spring force FsP and the first fluid pressure force Fp1P of the primary pulley 1, and the smaller necessary thrust FDS of the secondary pulley 2 is obtained by the difference between the secondary spring force FsS and the second fluid pressure force Fp2S, where Fp2P=0, and Fp1S=0. Therefore, the following equation is obtained.

$$\Delta FD = Fp1P + Fp2S$$

The thrust difference $\Delta FD$ at the highest speed ratio is obtained similarly to the thrust difference $\Delta FD$ at the lowest speed ratio, and is expressed by the following equation.

$$\Delta FD = Fp2P + Fp1S$$

This means that the spring forces FsP and FsS can be set to have a high value, for example, larger than the necessary thrust FDP or FDS, because the second fluid pressure forces Fp2P and Fp2S act to reduce the spring force FsP and FsS, respectively. In addition, necessary maximum fluid pressure to be supplied to the thrust applying mechanism 1A or 2A can be set to have about a half value of the necessary thrust difference $\Delta FD$ theoretically, which actually depends on the spring force FsP or FsS, because the thrust difference $\Delta FD$ is obtainable by the sum of the primary fluid pressure force FpP and the secondary fluid pressure force FpS. This reduction of the necessary maximum fluid pressure at the lowest or highest speed ratio enables the fluid-pump 42 to deduce its pump capacity, improving the fuel consumption of the vehicle with the above constructed CVT.

The continuously variable transmission of the embodiment has the following advantages.

The thrust applying mechanism 1A and 2A can apply the trust obtained by the resultant forces of the spring forces FsP and FsS, the first fluid pressure forces Fp1P and Fp1S acting in the same direction as the spring forces FsP and FsS, and the second fluid pressure forces Fp2P and Fp2S, respectively, which produces sufficient large thrust difference with lower pressure supplied to the thrust applying mechanism 1A and 2A at the lowest and highest speed ratios, decreasing the pump capacity of the fluid-pump 42 to improve fuel consumption of the vehicle with the above constructed CVT.

The thrust applying mechanism 1A and 2A has the primary and secondary springs 14 and 24 and the first and second fluid pressure chambers 15, 16, 25, and 27 that are arranged at the rear sides of the movable sheaves 13 and 23 of the primary and secondary pulleys 1 and 2, which can be easily altered from a conventional thrust applying mechanism equipped with a spring and one fluid pressure chamber.

The first and second fluid pressure chambers 15, 16, 25, and 27 can be easily constructed by defining fluid pressure chambers formed at the rear sides of the primary and secondary movable sheaves 13 and 23, by the fixed wall members 18 and 28 fixed on the primary and secondary shafts 11 and 21.

The primary and second pulleys 1 and 2 have the above constructed primary and secondary thrust applying mechanisms 1A and 2A, respectively, which enables the pulleys 1 and 2 to be applied by the sufficient thrust difference ΔDF despite of the lower fluid pressure.

While there have been particularly shown and described with reference to preferred embodiments thereof, it will be understood that various modifications may be made therein, and it is intended to cover in the appended claims all such modifications as fall within the true spirit and scope of the invention.

For example, although the continuously variable transmission of the embodiment is provided in the primary and secondary pulleys 1 and 2 with the thrust applying mechanisms 1A and 2A that produce the thrust acting on the movable sheaves 13 and 23 by the sum of the first fluid pressure force Fp1, the second fluid pressure force Fp2, and the spring force Fs, such a constructed thrust applying mechanism can be adopted only in a primary pulley when a speed ratio range of a CVT is made up mostly of low speed ratios, or only in a secondary pulley when a speed range of a CVT is made up mostly of high speed ratios.

A CVT with a thrust applying mechanism similar to one of the above embodiment can be used in a hybrid electric vehicle or a CVT for various industry machines.

The endless flexible members may be a chain including elements to contact with the primary and secondary pulleys and chain links carrying the elements, or a V-belt instead of push-belt used in the CVT of the embodiment.

The outer peripheral wall members 17a and 27a and the movable wall members 17b and 27b of the primary and secondary thrust applying mechanisms 1A and 2A may be coupled by a snap ring or others.

The entire contents of Japanese Patent Application No. 2004-004296 filed Jan. 9, 2005 is incorporated herein by reference.

What is claimed is:

1. A continuously variable transmission comprising:
a primary pulley having a primary movable sheave that is capable of moving to change a groove width of said primary pulley;
a secondary pulley having a secondary movable sheave that is capable of moving to change a groove width of said secondary pulley;
a belt engaged with said primary pulley and said secondary pulley to transmit torque therebetween;
a control valve unit that is capable of producing a first fluid pressure and a second fluid pressure to supply to a first fluid pressure chamber and a second fluid pressure chamber, respectively, of at least one of said primary pulley and said secondary pulley, said first and second fluid pressure chambers being fluid-tight;
a control unit that outputs a command to said control valve unit to obtain target fluid pressures of the first fluid pressure and the second fluid pressure; and
a thrust applying mechanism that is capable of applying a resultant force to the movable sheave of the at-least one of said primary and secondary pulleys so as to narrow the groove width thereof,
wherein the resultant force contains a spring force of a spring, a first fluid pressure force obtained based on the first fluid pressure and acting in the same direction as the spring force, and a second fluid pressure force based on the second fluid pressure and acting in a direction opposite to the spring force and the first fluid pressure force, and
wherein the first fluid pressure force and the second fluid pressure force are set such that the spring force is set to be larger than a thrust which is necessary to obtain one of a low speed ratio by said primary pulley and a high speed ratio by said secondary pulley.

2. The continuously variable transmission as set forth in claim 1, wherein said primary pulley has a primary fixed sheave arranged to face the primary movable sheave such that the primary movable sheave can move toward and away from the primary fixed sheave, the secondary pulley having a secondary fixed sheave arranged to face the secondary movable sheave such that the secondary movable sheave can move toward and away from the secondary fixed sheave, and said thrust applying mechanism having said spring to generate the spring force, said first fluid pressure chamber that generates the first fluid pressure force when pressurized fluid is introduced in said first fluid pressure chamber from the control valve unit, and said second fluid pressure chamber that generates the second fluid pressure force when pressurized fluid is introduced in said second fluid pressure chamber from the control valve unit.

3. The continuously variable transmission as set forth in claim 2, wherein said first and second fluid pressure chambers are divided by a fixed wall member fixed on a pulley shaft, said first fluid pressure chamber containing said spring disposed between the movable sheave and the fixed wall member to apply the spring force to the movable sheave.

4. The continuously variable transmission as set forth in claim 3, wherein said first and second fluid pressure chambers are defined by the movable sheave, the pulley shaft, an outer peripheral wall member joined with a rear side of the movable sheave, and a movable wall member connected with the outer peripheral wall member.

5. The continuously variable transmission as set forth in claim 1, wherein said primary and secondary pulleys each have said thrust applying mechanism.

6. The continuously variable transmission as set forth in claim 1, wherein the primary pulley has the first fluid pressure chamber and the second fluid pressure chamber, and the secondary pulley has a third fluid pressure chamber corresponding to the first fluid pressure chamber and a fourth fluid pressure chamber corresponding to the second fluid pressure chamber, and
wherein a thrust difference at a lowest speed ratio is obtained by an equation:

$$\Delta FD = (Fp1P + FsP - Fp2P) - (Fp1S + FsS - Fp2S),$$

where $\Delta FD$ is the thrust difference generated by the primary and secondary pulleys, $Fp1P$ is a first target fluid pressure force generated when the first fluid pressure is applied to the first fluid pressure chamber, $FsP$ is spring force of the primary pulley, $Fp2P$ is a second target fluid pressure force generated when the second fluid pressure is applied to the second fluid pressure chamber, $Fp1S$ is a third target fluid pressure force generated when a third fluid pressure corresponding to the first fluid pressure is applied to the third fluid pressure chamber, $FsS$ is spring force of the secondary pulley, and $Fp2S$ is a fourth target fluid pressure force generated when a fourth fluid pressure corresponding to the second fluid pressure is applied to the fourth fluid pressure chamber.

7. The continuously variable transmission as set forth in claim 6, wherein the spring forces FsP and FsS are set to be equal to each other such that the thrust difference is obtained as ΔFD=(Fp1P−Fp2P)−(Fp1S−Fp2S).

8. The continuously variable transmission as set forth in claim 7, wherein the second target fluid pressure force Fp2P and the third target fluid pressure force Fp1S are set to be zero in the equation for the thrust difference at the lowest speed ratio such that the thrust difference is obtained as ΔFD=Fp1P+Fp2S.

9. The continuously variable transmission as set forth in claim 6, wherein the second target fluid pressure force Fp2P and the third target fluid pressure force Fp1S are set to be zero in the equation for the thrust difference at the lowest speed ratio.

10. The continuously variable transmission as set forth in claim 1, wherein the first and second fluid pressure chambers are fluid-tight such that pressure levels of the first and second fluid pressures are maintained.

11. A thrust applying method used in a continuously variable transmission that is equipped with a primary pulley having a primary movable sheave that is capable of moving to change a groove width of said primary pulley, a secondary pulley having a secondary movable sheave that is capable of moving to change a groove width of said secondary pulley, and a belt engaged with said primary pulley and said secondary pulley to transmit torque therebetween, said method comprising:

applying a spring force of a spring of a thrust applying mechanism to the movable sheave of at least one of said primary and secondary pulleys so as to narrow the groove width thereof;

supplying a first fluid pressure from a control valve unit to a first fluid pressure chamber, which is fluid-tight, of the at-least one of said primary and secondary pulleys such that the first fluid pressure is controlled as a target fluid pressure by a control unit so as to generate a first fluid pressure force by said thrust applying mechanism in the same direction as the spring force; and supplying a second fluid pressure from the control valve unit to a second fluid pressure chamber, which is fluid-tight, of the at-least one of said primary and secondary pulleys such that the second fluid pressure is controlled as a target fluid pressure by the control unit so as to generate a second fluid pressure force by said thrust applying mechanism in a direction opposite to the spring force and the first fluid pressure force, wherein the movable sheave of the at-least one of said primary and secondary pulleys is pressed by thrust obtained by a resultant force of the spring force, the first fluid pressure force, and the second fluid pressure force, and wherein the first fluid pressure force and the second fluid pressure force are set such that the spring force is set to be larger than a thrust which is necessary to obtain one of a low speed ratio by said primary pulley and a high speed ratio by said secondary pulley.

12. The thrust applying method as set forth in claim 11, wherein said primary pulley has a primary fixed sheave arranged to face the primary movable sheave such that the primary movable sheave can move toward and away from the primary fixed sheave, the secondary pulley having a secondary fixed sheave arranged to face the secondary movable sheave such that the secondary movable sheave can move toward and away from the secondary fixed sheave, and said thrust applying mechanism having said spring to generate the spring force, wherein said thrust applying mechanism comprises said first fluid pressure chamber that generates the first fluid pressure force when pressurized fluid is introduced in said first fluid pressure chamber from the control valve unit, and said second fluid pressure chamber that generates the second fluid pressure force when pressurized fluid is introduced in said second fluid pressure chamber from the control valve unit.

13. The thrust applying method as set forth in claim 12, wherein said first and second fluid pressure chambers are divided by a fixed wall member fixed on a pulley shaft, said first fluid pressure chamber containing said spring disposed between the movable sheave and the fixed wall member to apply the spring force to the movable sheave.

14. The thrust applying method as set forth in claim 13, wherein said first and second fluid pressure chambers are defined by the movable sheave, the pulley shaft, an outer peripheral wall member joined with a rear side of the movable sheave, and a movable wall member connected with the outer peripheral wall member.

15. The thrust applying method as set forth in claim 11, wherein said primary and secondary pulleys each have said thrust applying mechanism.

16. The thrust applying method as set forth in claim 11, wherein the primary pulley has the first fluid pressure chamber and the second fluid pressure chamber, and the secondary pulley has a third fluid pressure chamber corresponding to the first fluid pressure chamber and a fourth fluid pressure chamber corresponding to the second fluid pressure chamber, and wherein a thrust difference at a lowest speed ratio is obtained by an equation:

$$\Delta FD=(Fp1P+FsP-Fp2P)-(Fp1S+FsS-Fp2S),$$

where ΔFD is the thrust difference generated by the primary and secondary pulleys, Fp1P is a first target fluid pressure force generated when the first fluid pressure is applied to the first fluid pressure chamber, FsP is spring force of the primary pulley, Fp2P is a second target fluid pressure force generated when the second fluid pressure is applied to the second fluid pressure chamber, Fp1S is a third target fluid pressure force generated when a third fluid pressure corresponding to the first fluid pressure is applied to the third fluid pressure chamber, FsS is spring force of the secondary pulley, and Fp2S is a fourth target fluid pressure force generated when a fourth fluid pressure corresponding to the second fluid pressure is applied to the fourth fluid pressure chamber.

17. The thrust applying method as set forth in claim 16, wherein the spring forces FsP and FsS are set to be equal to each other such that the thrust difference is obtained as ΔFD=(Fp1P−Fp2P)−(Fp1S−Fp2S).

18. The thrust applying method as set forth in claim 17, wherein the second target fluid pressure force Fp2P and the third target fluid pressure force Fp1S are set to be zero in the equation for the thrust difference at the lowest speed ratio such that the thrust difference is obtained as ΔFD=Fp1P+Fp2S.

19. The thrust applying method as set forth in claim 16, wherein the second target fluid pressure force Fp2P and the third target fluid pressure force Fp1S are set to be zero in the equation for the thrust difference at the lowest speed ratio.

20. The thrust applying method as set forth in claim 11, wherein the first and second fluid pressure chambers are fluid-tight such that pressure levels of the first and second fluid pressures are maintained.

* * * * *